June 9, 1953   K. E. LEUTZ   2,641,526
GAS PURIFICATION
Filed April 12, 1949
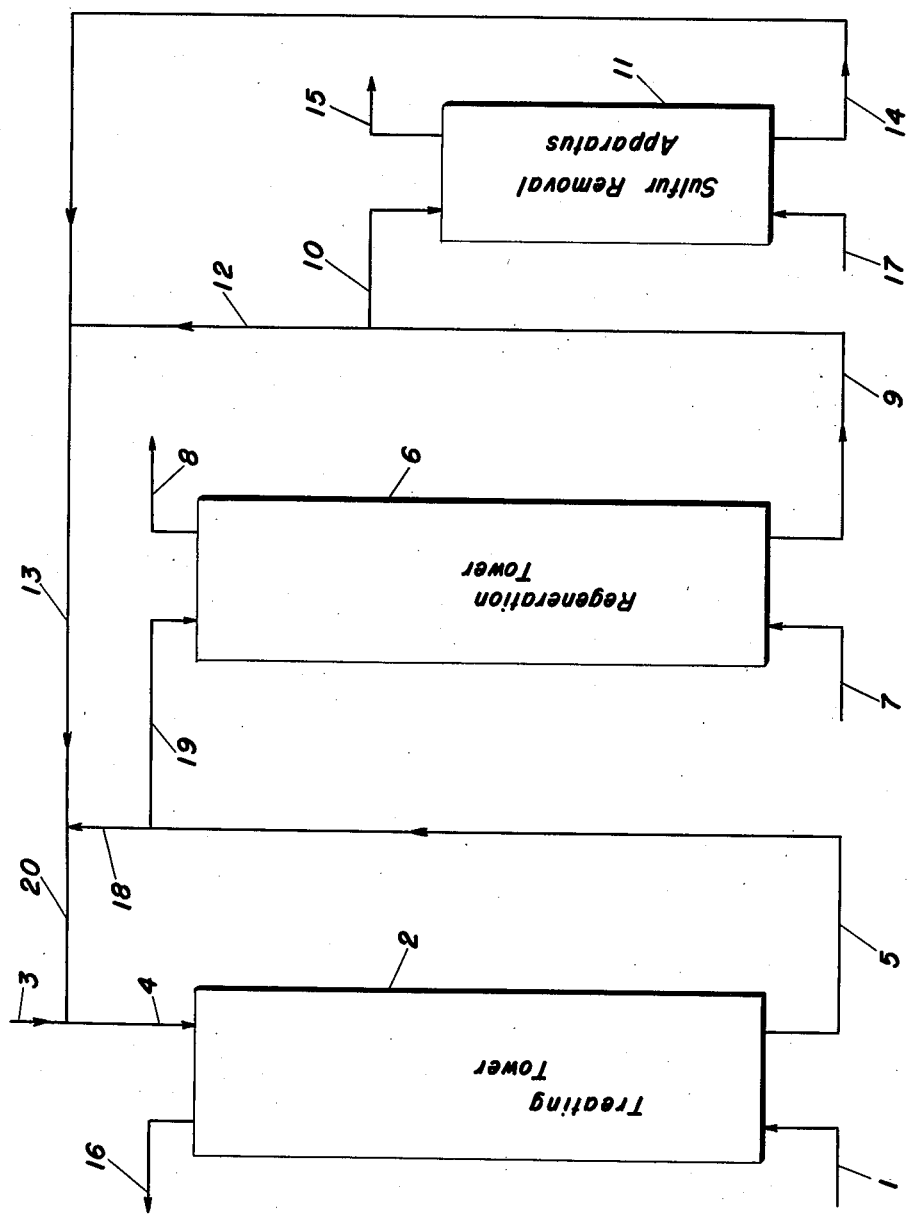
INVENTOR.
KOERNER E. LEUTZ
BY
Busser and Harding
ATTORNEYS Patented June 9, 1953

2,641,526

UNITED STATES PATENT OFFICE 2,641,526

GAS PURIFICATION

Koerner E. Leutz, Toledo, Ohio, assignor to Sun Oil Company, Philadelphia, Pa., a corporation of New Jersey Application April 12, 1949, Serial No. 86,891

11 Claims. (Cl. 23—2)

This invention relates to the removal of hydrogen sulfide from gaseous mixtures. More particularly, it relates to the selective removal of hydrogen sulfide from gaseous mixtures containing the same and carbon dioxide.

Removal of hydrogen sulfide from gaseous mixtures has previously been accomplished by contacting such mixtures with metallic oxides in solid form or with alkaline solutions or suspensions. The use of solid masses has the disadvantage that, after such masses have become fouled with hydrogen sulfide, they are difficult to regenerate for further use. The use of alkaline aqueous materials has the disadvantage that such materials do not selectively remove hydrogen sulfide from gaseous materials containing carbon dioxide as well as hydrogen sulfide. Such materials remove carbon dioxide too, with the result that more of the material is required for a given amount of gas.

It is often the case that industrial gases contain varying quantities of carbon dioxide as well as hydrogen sulfide. An example is refinery hydrocarbon gases such as are derived from catalytic cracking operations. While it is desirable to remove hydrogen sulfide from these gaseous mixtures before they are used for other purposes, for example as fuel gas, it is not usually necessary or desirable to remove the carbon dioxide, because these gaseous mixtures have very high heating values even with carbon dioxide present. Therefore selective removal of hydrogen sulfide eliminates the extra expense of removing carbon dioxide.

I have discovered that hydrogen sulfide may be selectively and inexpensively removed from mixtures containing the same and carbon dioxide by contacting such mixtures with an aqueous suspension containing a precipitated iron hydroxide including ferrous hydroxide and having a pH within the range 4–7.

The invention is particularly well adapted to gas purification in a cyclic process wherein the aqueous treating suspension, in a purification stage, contacts a gaseous mixture and removes hydrogen sulfide therefrom by precipitation of iron sulfide, and, in a regeneration stage, contacts a free-oxygen containing gas which renders it again capable of purifying more of the gaseous mixture, probably through oxidation of iron sulfide to iron hydroxide and free sulfur. The latter may be removed from the treating suspension by any of the methods which are known in the art, as subsequently described.

It has been found that aqueous suspensions of iron hydroxide exhibit characteristic patterns of pH behavior when employed in cyclic processes as described above. For example, the pH of a freshly prepared ferrous hydroxide suspension will decrease during the first purification stage, probably because of neutralization of the hydroxide, and increase during subsequent purification stages, probably because of reduction of ferric hydroxide formed during the regeneration stage to the more soluble ferrous hydroxide. The pH decreases during all regeneration stages, probably because of oxidation of ferrous hydroxide. The contrary pH effects of the purification and regeneration stages can be made to balance each other, with the result that in cyclic operation the pH and, apparently, the composition of the regenerated treating agent are approximately the same after each cycle. Also, since the pH decreases during both the first purification stage and the first regeneration stage, it is possible to begin with a freshly prepared treating agent having a pH somewhat above 7 and, without adding any acidic reagents, end the first and subsequent cycles with a regenerated treating agent having a pH within the range 4–7.

The aqueous treating suspension of the invention may be prepared in a variety of ways, such as by adding a basic compound, e. g., sodium hydroxide, sodium tetraborate, sodium acetate, or ammonium hydroxide, to an aqueous solution of a water-soluble iron salt, such as ferrous chloride or ferrous sulfate, having a strongly acidic anion. An insoluble precipitate of iron hydroxide will be formed in the solution. If the other ions which enter into the reaction do not form a water-insoluble salt, the hydroxide of iron may, by filtration, be obtained substantially free of other materials and may be suspended in fresh water to give a treating suspension containing no substantial amount of dissolved material other than the small amount of iron hydroxide which dissolves. The presence of substantial amounts of other dissolved material in the treating suspension is not, however, detrimental to the action thereof according to the invention, and the filtration step is not strictly necessary.

When a treating suspension is prepared by adding a basic compound to an aqueous solution of ferrous sulfate, without subsequent filtration of the ferrous hydroxide precipitate, the hydrogen sulfide holding capacity of the treating suspension varies according to the nature of the base. For a given molar concentration in the treating suspension, sodium tetraborate gives a treating suspension having a holding capacity more than twice that given by sodium hydroxide.

Sodium acetate gives a lower holding capacity than sodium hydroxide, and ammonium hydroxide still lower.

The pH of the treating suspension must be within the range 4–7. Below the lower limit of this range, the treating agent becomes unduly corrosive and its holding capacity for hydrogen sulfide decreases to a degree such that the operation is no longer commercially feasible. For optimum holding capacity, in fact, it is preferred that the pH of the treating suspension be within the range 5–7. Above a pH of 7, carbon dioxide begins to be absorbed by the suspension to an undesirable degree.

The means employed to secure the desired pH will vary according to the nature of the iron hydroxide suspension. If this suspension has initially a pH above 7, it may be reduced to an operable value by addition of an acid or by agitation with a free oxygen-containing gas, thereby oxidizing part of the ferrous hydroxide to ferric hydroxide, a compound which is less soluble in water than ferrous hydroxide and imparts to the mixture a lower pH.

It is to be noted that an aqueous material containing in suspension a given concentration of iron hydroxide will have a pH which is a function of the degree of oxidation of the aqueous material, that is, of the relative proportions of ferric and ferrous hydroxides therein. For example, an aqueous suspension of iron hydroxide prepared by adding 0.4 mole of ferrous sulfate and 0.1 mole of sodium hydroxide to a liter of water will, upon oxidation, decrease in pH from a value above 7 to a value substantially below 4. The higher pH values occur at the higher ratios of ferrous hydroxide to ferric hydroxide. The minimum pH is obtained when all ferrous hydroxide has been oxidized to ferric hydroxide. For the purposes of the present invention, it is preferred to work with treating agents containing only a minor proportion of ferric hydroxide, because at pH values which are too low, the possibilities of corrosion become too great, and also the amount of hydrogen sulfide which the treating suspension can hold is considerably reduced.

The concentration of iron in the treating suspension may vary. Concentrations of iron within the range 0.05 to 0.8 mole per liter have been found satisfactory. It is inadvisable to use concentrations above 0.8 mole per liter, because the suspension then becomes too viscous to be handled readily, and also excessive foaming is likely to take place when the treating suspension intimately contacts a gaseous material. A preferred range is 0.3 to 0.5 mole per liter.

When the treating suspension is prepared by adding a base to an aqueous solution of a water-soluble iron salt, the latter should have a concentration in the solution within the range 0.05 to 0.8 mole per liter. The concentration of the added base may vary considerably. It is generally desirable to add enough base to give the maximum amount of hydroxide precipitate without obtaining as a consequence a treating suspension which cannot be conveniently brought within the desired pH range by oxidation.

In general, the amount of basic compound should not be substantially greater than that required to precipitate all of the iron ion as iron hydroxide. When alkali metal hydroxide or alkali metal acetate is used as the basic compound with a ferrous salt, the number of moles of the basic compound added to a liter of solution should be at least 0.1 and not substantially greater than twice the number of moles of ferrous salt in the original solution. When alkali metal tetraborate is used as the basic compound, the number of moles added to a liter of solution is preferably within the range 0.05–0.1; when more than 0.1 mole is used, the suspension becomes viscous and difficult to handle.

The temperature at which the purification stage is carried out has little or no effect on the amount of hydrogen sulfide removed. By increasing the temperature of regeneration, however, from, for example, 70° F. to 115° F., the rate of regeneration may be approximately doubled.

For purposes of illustration, an embodiment of the invention is shown on the accompanying drawing, in which the figure is a diagrammatic view of an apparatus for removing hydrogen sulfide from gaseous mixtures.

The impure gaseous mixture to be treated is introduced through an inlet 1 into the base of a treating tower 2. The gas flows upwardly through the treating tower 2 where it is intimately contacted with a descending stream or spray of aqueous treating agent. The treated gas leaves the tower through an outlet 16 for storage or further use.

The treating agent is made up and its pH adjusted to a value within the range 4–7. The latter may be done, as previously indicated, by putting a freshly prepared ferrous hydroxide treating agent having a pH somewhat above 7 through one cycle of purification and regeneration, at the end of which its pH is within the proper range 4–7. The treating agent is introduced through lines 3 and 4 into the top of the treating tower 2, wherein it descends, intimately contacting the gases to be treated, which are flowing upwardly through the tower. The fouled treating agent is removed from the base of the treating tower 2 through line 5 and is conducted through line 19 to the top of the regeneration tower 6, where the treating agent is intimately contacted with a free-oxygen containing gas, e. g. air, for regeneration purposes.

The regeneration air in introduced through line 7 into the base of the regeneration tower 6. The air flows upwardly through the tower, intimately contacting the fouled treating agent which flows downwardly through the tower. The air is discharged from the tower into the atmosphere through line 8. The revivified treating agent is removed from the base of the regeneration tower 6 through line 9 and passes either through line 10 to sulfur removal apparatus 11 or through lines 12, 13, 20, and 4 to the top of treating tower 2 again.

In sulfur removal apparatus 11, the treating agent contacts a solvent which is selective to sulfur, e. g., benzene, naphtha, or other liquid hydrocarbon, introduced through line 17. Conventional means are provided within the sulfur removal apparatus 11 for separation of the hydrocarbon and aqueous phases, and hydrocarbon containing sulfur dissolved therein is removed through line 15 to solvent recovery means not shown. The sulfur-free regenerated treating agent passes from sulfur removal tank 11 through lines 14, 13, 20, and 4 to the top of treating tower 2.

Instead of a solvent extraction system as described above, sulfur removal apparatus 11 may comprise any other type of apparatus capable of removing free sulfur from admixture with iron hydroxide precipitates in an aqueous medium. For example, a sort of flotation method may be used wherein the regenerated treating agent is agitated with a gas under conditions such that the sulfur becomes concentrated in a layer of foam above the treating agent.

Since, in the regeneration of the treating agent, it is generally desirable to obtain by oxidation only a minor proportion of ferric hydroxide in the suspended iron hydroxides, and since it is not always convenient to provide in regeneration tower 6 the close control over oxidizing conditions that would enable obtaining for the entire fouled treating agent stream the exact degree of oxidation required; it may be desirable in some cases to pass only a portion of the fouled treating agent through line 19 to the regeneration tower 6; this portion can be oxidized completely to the ferric hydroxide stage, then recombined through lines 9, 12, and 13, with the unregenerated portion passing through line 18. When this procedure is followed, the unregenerated portion will usually contain some ferrous hydroxide which has not reacted with hydrogen sulfide; in fact, it is usually desirable to proportion the flow rates in treating tower 2 in such a way that there is an excess of iron hydroxide in the treating agent over that required for reaction with hydrogen sulfide. The commingled regenerated and unregenerated streams, passing through lines 20 and 4 to the treating tower 2, will usually therefore contain both ferrous and ferric hydroxides, even in the case where the regenerated stream has been completely oxidized to the ferric hydroxide state.

Either or both the treating tower 2 and the regeneration tower 6 can be of a type common in industrial usage. Any satisfactory method for insuring intimate contacting of the gas and treating agent may be employed, such for instance as spray nozzles, bubble cap plates, or packing the towers with raschig rings or the like. The only requirement is that sufficient contact time and surface be provided to effect the desired results.

From the above description, it will be apparent that I have produced a simple and efficient method for removing hydrogen sulfide from gaseous mixtures without substantially decreasing the carbon dioxide content of the mixtures. An important feature resides in controlling the pH of the suspension employed in treating the gases in order to prevent substantial absorption of carbon dioxide.

The following example illustrates the invention:

*Example*

Ferrous sulfate was dissolved in water to produce 0.4 molar solution. 0.8 mole per liter of sodium hydroxide was added to the solution to precipitate ferrous hydroxide. The resulting suspension had a pH of about 11.5, which was reduced to about 8 by the addition of sulfuric acid.

An acidic gas containing hydrogen sulfide and carbon dioxide was bubbled through the treating suspension until the latter had absorbed about 11 grams per liter of hydrogen sulfide and had a pH of about 5.75.

Air was bubbled through the fouled suspension to oxidize the iron sulfide therein. At the end of this regeneration stage, the pH of the suspension was about 5.4.

Subsequent gas treatments raised the pH to about 5.75, and subsequent regenerations decreased it to about 5.4. Negligible amounts of carbon dioxide were removed from the acidic gas during the treating stages.

It is to be noted that, in the preparation of the treating agent, the ferrous hydroxide may be separated by filtration from the solution in which it is precipitated and suspended in fresh water to give a quite comparable treating agent containing no substantial amount of dissolved material.

The process of the present invention, wherein the treating agent is acidic and the fouled treating agent containing iron sulfide is likewise acidic, is further advantageous over processes wherein an alkaline suspension of iron sulfide is regenerated by oxidation, in that such regeneration is more readily accomplished in an acidic medium probably because the iron sulfide is more soluble in an acidic medium, a condition which favors the reaction of the iron sulfide precipitate with oxygen.

In my copending application Serial No. 86,892, filed April 12, 1949, there is disclosed and claimed a process for selective removal of hydrogen sulfide from a gaseous mixture containing the same and carbon dioxide by treating the gaseous mixture with a treating agent consisting essentially of water and, dissolved therein, an iron salt having a weakly acidic anion, the treating agent having a pH within the range 4–7.

I claim:

1. Process for selectively removing $H_2S$ from gases also containing $CO_2$ which comprises: contacting in a treating zone a gas containing $H_2S$ and $CO_2$ with a treating agent comprising an aqueous suspension of ferrous hydroxide thereby to form iron sulfide; removing from said treating zone a gas containing substantially all of the $CO_2$ originally present, but substantially less than all of the $H_2S$ originally present; separately removing from said treating zone the fouled treating agent now containing iron sulfide in suspension; regenerating the removed treating agent by contact with free-oxygen-containing gas in a regeneration zone; re-introducing the regenerated treating agent into said treating zone; measuring the pH of the regenerated treating agent and adjusting said pH, thereby to maintain the regenerated treating agent in acidic condition and at a pH not less than 4 substantially throughout the duration of the process.

2. Process according to claim 1 wherein said treating agent is maintained at a pH not less than 5.

3. Process according to claim 1 wherein said aqueous suspension contains 0.05 to 0.8 mole of iron hydroxide per liter of suspension.

4. Process according to claim 1 wherein said aqueous suspension contains 0.3 to 0.5 mole of iron hydroxide per liter of suspension.

5. Process according to claim 1 wherein said treating agent comprises iron hydroxide consisting essentially of a major proportion of ferrous hydroxide and a minor proportion of ferric hydroxide.

6. Process according to claim 1 wherein said gas containing $H_2S$ and $CO_2$ is a petroleum refinery fuel gas.

7. Process according to claim 1 wherein free sulfur is separated from said regenerated treating agent prior to re-introduction of the latter into said treating zone.

8. Process for selectively removing $H_2S$ from gases also containing $CO_2$ which comprises: contacting in a treating zone a gas containing $H_2S$ and $CO_2$ with a treating agent comprising an aqueous suspension of ferrous hydroxide, said treating agent having been originally prepared by reacting an aqueous solution of a ferrous salt with a basic compound selected from the group consisting of alkali metal and ammonium basic compounds to precipitate ferrous hydroxide and acidifying the resulting suspension to obtain an acidic treating agent having pH not less than 4; removing from said treating zone a gas containing substantially all of the $CO_2$ originally present, but substantially less than all of the $H_2S$ originally present; separately removing from said treating zone the fouled treating agent now containing iron sulfide in suspension; regenerating the removed treating agent by contact with free-oxygen-containing gas in a regeneration zone; reintroducing the regenerated treating agent into said treating zone; measuring the pH of the regenerated treating agent and adjusting said pH, thereby to maintain the regenerated treating agent in acidic condition and at a pH not less than 4, substantially throughout the duration of the process.

9. Process according to claim 8 wherein said ferrous salt is ferrous sulfate and said basic compound is an alkali metal hydroxide.

10. Process according to claim 8 wherein said ferrous salt is ferrous sulfate and said basic compound is an alkali metal tetraborate.

11. Process according to claim 8 wherein said ferrous salt is ferrous sulfate and said basic compound is an alkali metal acetate.

KOERNER E. LEUTZ.

References Cited in the file of this patent
UNITED STATES PATENTS

| Number | Name | Date |
|---|---|---|
| 1,510,342 | Rambush | Sept. 30, 1924 |
| 1,700,698 | Fulweiler | Jan. 29, 1929 |
| 1,708,590 | Reeson | Apr. 9, 1929 |
| 1,847,795 | Thorsell | Mar. 1, 1932 |
| 1,854,491 | Sperr | Apr. 19, 1932 |
| 1,995,545 | Leahy | Mar. 26, 1935 |
| 2,028,125 | Shaw | Jan. 14, 1936 |
| 2,085,523 | Belchetz | June 29, 1937 |
| 2,143,393 | Ulrich | Jan. 10, 1939 |
| 2,616,834 | Leutz | Nov. 4, 1952 |

OTHER REFERENCES

Feld: Article in "Zeitschrift für angewandte Chemie," vol. 24, pages 97–102 (pp. 99 and 100 pertinent), 1911.